Patented Mar. 14, 1939

2,150,331

UNITED STATES PATENT OFFICE 2,150,331

PURIFICATION OF MALEIC ANHYDRIDE

Edwin R. Littmann, Wilmington, Del., assignor to Hercules Powder Company, Wilmington, Del., a corporation of Delaware No Drawing. Application February 20, 1937, Serial No. 126,945

12 Claims. (Cl. 260—343)

This invention relates to the purification of maleic anhydride.

Heretofore, crude maleic anhydride has been purified by distilling an aqueous solution of maleic acid, distilling maleic acid from an aqueous solution containing an oxidizing agent, such as nitric acid, by extraction of aqueous maleic acid by selective solvents, recrystallizing maleic acid or anhydride from an organic solvent, sublimation of the crude maleic anhydride, with contact of the vapors thereof with a contact catalyst, distillation of maleic anhydride with xylol, treatment of crude maleic anhydride vapors with a reducing agent, etc.

All these methods are objectionable as regards cost of operation, incompleteness of the degree of purification of the maleic anhydride, necessity for elimination of water or organic solvents, complexity of process and apparatus required, etc.

I have found that I can overcome the objections to the prior art practices and that I can purify maleic anhydride very simply, cheaply and completely by the use of my improved process, which is described in greater detail hereinbelow.

My improved method for purifying maleic anhydride comprises the treatment of maleic anhydride, which contains more or less impurity, with anthracene or furan, to form an anthracene-maleic anhydride compound or a furan-maleic anhydride compound which may readily be separated from the maleic anhydride impurities and which may readily be decomposed to give purified maleic anhydride.

In order to illustrate my novel process I may pass crude gases which contain maleic anhydride vapors through fused anthracene. I have found it desirable to maintain the anthracene while it is being subjected to the maleic anhydride vapors at temperatures between about 200° C. and 260° C. Under these conditions the maleic anhydride in the crude gases combines to form an anthracene-maleic anhydride compound. The crude gases, for example, may be passed through the fused anthracene until the latter has been entirely consumed in forming the anthracene-maleic anhydride compound. After the reaction is complete the anthracene-maleic anhydride compound is permitted to cool and solidify. Some of the impurities originally present with the maleic anhydride are removed with the exhaust gases which have been passed through the fused anthracene. Other of the impurities may be found associated with the solidified anthracene-maleic anhydride compound. These latter impurities may be removed by washing the anthracene-maleic anhydride compound with a suitable selective solvent in which the anthracene-maleic anhydride compound is insoluble or but slightly soluble. Such selective solvents may be illustrated by benzene, carbon bisulfide, carbon tetrachloride, ether, xylene, methanol, etc. One or several of these solvents may be used if desired in washing the anthracene-maleic anhydride compound.

The washed and purified anthracene-maleic anhydride compound is then dried or heated to remove any of the selective solvent which may remain present and is then heated to a temperature at or about the decomposition temperature of the anthracene-maleic anhydride compound. I have found that temperatures of about 260° C. to 360° C. are suitable for this decomposition step. Naturally the temperature employed must be above the decomposition temperature of the anthracene-maleic anhydride compound, which is about 260° C., and yet it should not be high enough to cause any secondary decomposition of either the maleic anhydride or the anthracene.

When heated as indicated above the anthracene-maleic anhydride compound breaks down and liberates pure maleic anhydride and the anthracene. The liberated pure maleic anhydride, which is obtained in vapor form, may suitably be condensed to its solid form. I have found that the purified maleic anhydride may be readily separated from the anthracene if the temperature of decomposition of the anthracene-maleic anhydride compound is kept below the boiling point of anthracene, i. e. approximately 360° C., so that no anthracene is permitted to distil over with the maleic anhydride vapors.

Various modifications of the procedure illustrated above may be employed; for example, instead of using crude gases containing maleic anhydride vapors, such, for example, as the gases resulting from the catalytic oxidation of a hydrocarbon vapor by air or oxygen to produce maleic anhydride there may be employed maleic anhydride produced by other methods and in other forms, thus; crude maleic anhydride which has been separate from the gases which attend it when produced by the catalytic oxidation process may be vaporized and passed through the anthracene. Furthermore, maleic anhydride which may have been imperfectly purified by any of the known methods of the prior art may be vaporized and passed through the anthracene.

I have found that not only may the maleic anhydride be passed through fused anthracene, but also solutions of anthracene, for example solutions in decalin or para-cymene may be employed. I found that when such solutions of anthracene are used it is desirable to maintain them at temperatures of between about 200° C. and 260° C. When such solutions are employed the anthracene-maleic anhydride compound may be separated from the solvent and suitably washed with a suitable selective solvent.

As a further illustration of my invention I have found that maleic anhydride may be purified by forming a furan-maleic anhydride compound. When operating my process in accordance with my invention and with the use of furan the maleic anhydride to be purified is contacted with furan, preferably at approximately room temperature. As explained above in connection with anthracene, some of the maleic anhydride impurities pass through the furan and are removed from the system. Other of the impurities may be found associated with the furan maleic anhydride compound. This compound, after the reaction has been completed, may be permitted to cool and solidify and the attendant impurities may then be washed with selective solvents in which the furan-maleic anhydride compound is insoluble or but slightly soluble. Such solvents may be illustrated by ether, carbon tetrachloride, and benzene.

The pure furan-maleic anhydride compound is then dried, for example, by warm air or by a mild heat treatment in order to remove any selective solvent present. The dried and purified furan-maleic anhydride compound is then heated between about 125° C. and 175° C. in order to decompose the compound into furan and maleic anhydride. The vapors from the decomposition of the product may be passed through a fractional condenser and the first or high boiling fraction comprising pure maleic anhydride condensed at a temperature of below about 200° C. and the second or low boiling fraction comprising furan being condensed at about 31.4° C.

With any of the modifications of my process it will be understood that the purified maleic anhydride obtained in vapor form (from the decomposition of either the anthracene-maleic anhydride compound or the furan-maleic anhydride compound) may be condensed as pure maleic anhydride or may be passed in vapor form into any suitable reaction chamber and for such other disposition as may be desired. It will be understood that in carrying out my process (with either anthracene or furan) the recovered reagent, after the maleic anhydride compound shall have been decomposed, may be re-utilized in order to purify further amounts of maleic anhydride. It will thus be understood that my process may be either a batch process or a continuous one.

I do not restrict myself to any particular apparatus or method of carrying out my process except as defined in the claims appended hereto. Thus, for example, I may pass the maleic anhydride vapors through a single vessel of anthracene or furan or through a series of vessels or I may pass the maleic anhydride vapors through a contact tower or a series of towers through which the anthracene or furan may be passed in suitable form.

What I claim is:

1. The process of purifying maleic anhydride which comprises contacting maleic anhydride and its attendant impurities with an organic, unsaturated substance from the group consisting of anthracene and furan to form a compound of said maleic anhydride and said substance, removing at least part of the said impurities as vapors during the formation of said compound, thereafter heating said compound to decompose it, and recovering the purified maleic anhydride.

2. The process of purifying maleic anhydride which comprises contacting maleic anhydride and its attendant impurities with an organic, unsaturated substance from the group consisting of anthracene and furan to form a compound of said maleic anhydride and said substance, washing said compound to remove the impurities therefrom, thereafter heating said compound to decompose it, and recovering the purified maleic anhydride.

3. The process for purification of maleic anhydride which includes treating crude maleic anhydride with an organic, unsaturated substance from the group consisting of anthracene and furan, to form a compound therewith, treating said compound with a solvent for the impurities in said compound, removing said solvent from said compound, heating said compound to its decomposition temperature, and condensing pure maleic anhydride.

4. The process for purification of maleic anhydride which includes treating crude maleic anhydride in vapor form with an organic, unsaturated substance from the group consisting of anthracene and furan, to form a compound therewith, heating said compound to its decomposition temperature, and condensing pure maleic anhydride.

5. The process for purification of maleic anhydride which includes treating crude maleic anhydride in vapor form with an organic, unsaturated substance from the group consisting of anthracene and furan, to form a compound therewith, treating said compound with a solvent for the impurities in said compound, removing said solvent from said compound, heating said compound to its decomposition temperature, and condensing pure maleic anhydride.

6. The process of purifying maleic anhydride which comprises contacting maleic anhydride and its attendant impurities with anthracene to form an anthracene-maleic anhydride compound, treating said compound to remove the impurities, thereafter heating said compound to decompose it, and recovering the purified maleic anhydride.

7. The process of purifying maleic anhydride which comprises contacting maleic anhydride and its attendant impurities with furan to form a furan-maleic anhydride compound, treating said compound to remove the impurities, thereafter heating said compound to decompose it, and recovering the purified maleic anhydride.

8. The process of purifying maleic anhydride which comprises contacting maleic anhydride and its attendant impurities with an organic, unsaturated substance from the group consisting of anthracene and furan to form a compound of said maleic anhydride and said substance, removing at least part of the said impurities as vapors during the formation of said compound, treating said compound with a solvent for the remaining impurities in said compound, thereafter heating said compound to decompose it, separating the decomposition products and recovering the purified maleic anhydride.

9. The process of purifying crude maleic anhydride which comprises contacting crude maleic anhydride and its attendant impurities with anthracene to form a solid compound of maleic anhydride and anthracene, removing at least part of the said impurities as vapors during the formation of said compound, thereafter heating the said compound to decompose it, and recovering pure maleic anhydride.

10. The process of purifying crude maleic anhydride which comprises contacting crude maleic anhydride and its attendant impurities with anthracene to form a solid compound of maleic anhydride and anthracene, washing said compound with a solvent for the impurities in said compound, removing said solvent from said compound, heating said compound to its decomposition temperature, and recovering pure maleic anhydride.

11. The process of purifying crude maleic anhydride which comprises contacting crude maleic anhydride in vapor form with anthracene to form a solid compound of maleic anhydride and anthracene, removing at least part of the said impurities as vapors during the formation of said compound.

12. The process of purifying crude maleic anhydride which comprises contacting maleic anhydride, with its attendant impurities, with anthracene to form a compound of maleic anhydride and anthracene, removing at least part of the said impurities as vapors during the formation of said compound, treating said compound with a solvent for the remaining impurities in said compound, thereafter heating said maleic anhydride-anthracene compound to decompose it, separating the decomposition products, and recovering purified maleic anhydride.

EDWIN R. LITTMANN.